April 14, 1936.　　　W. W. SLOANE　　　2,037,182
SHAKER CONVEYER
Filed June 9, 1934　　　2 Sheets-Sheet 1
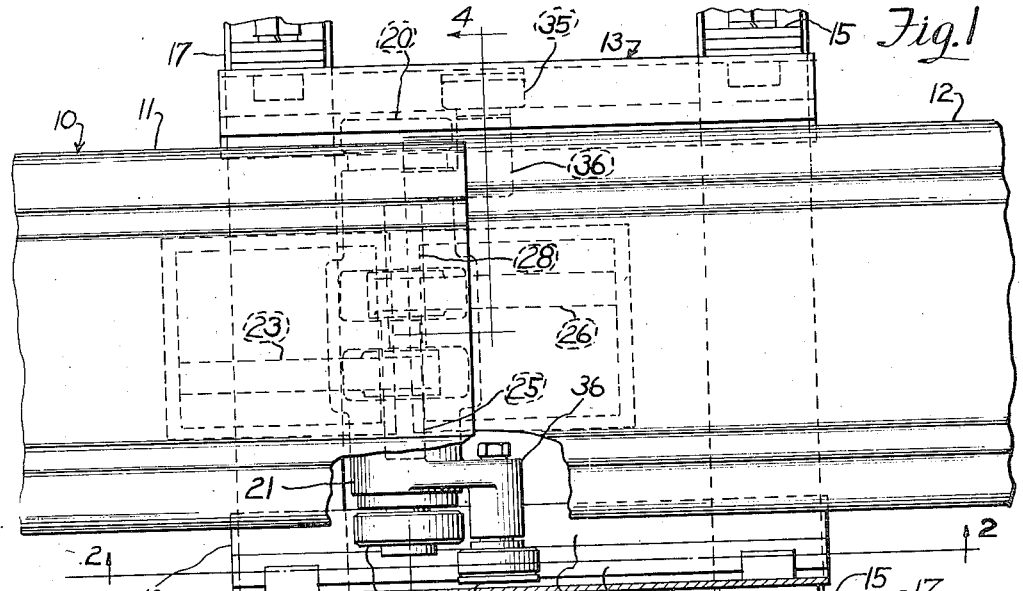
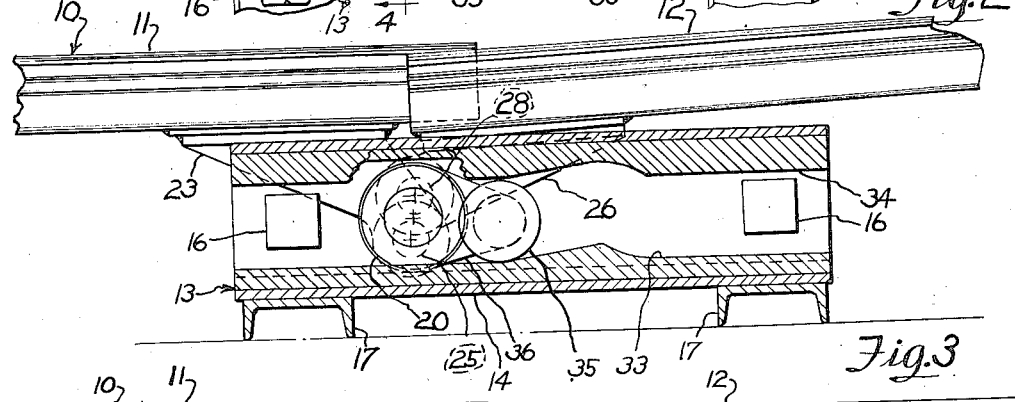
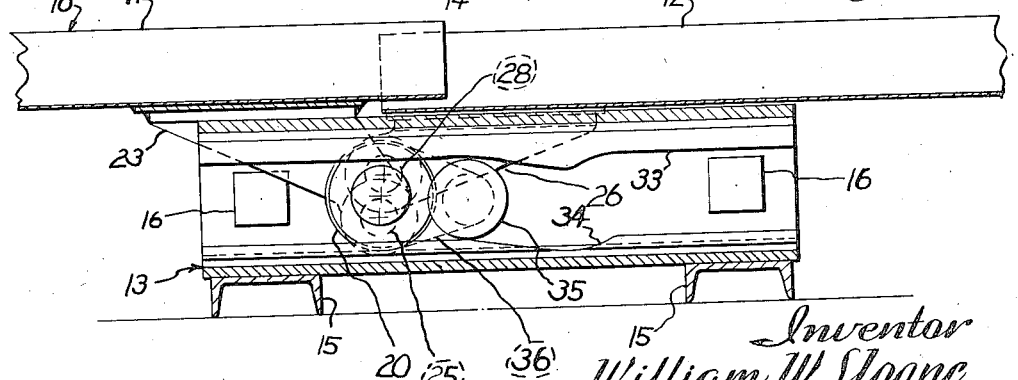
Inventor
William W. Sloane
Clarence F. Poole
Attorney April 14, 1936.  W. W. SLOANE  2,037,182
SHAKER CONVEYER
Filed June 9, 1934  2 Sheets-Sheet 2
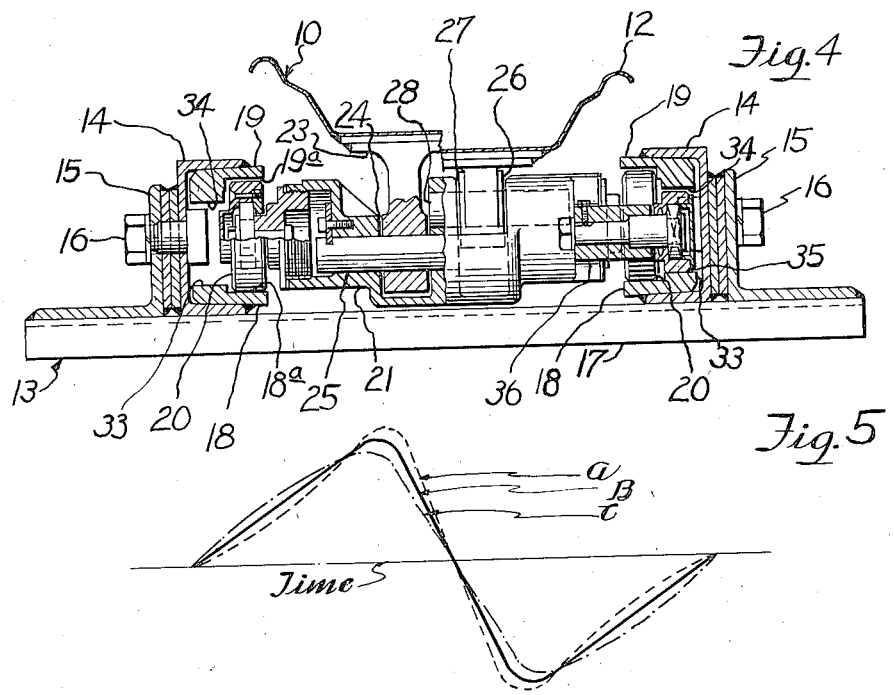
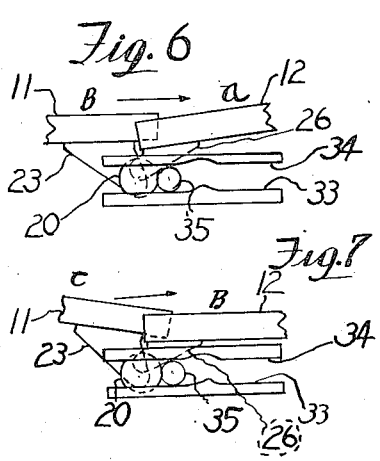
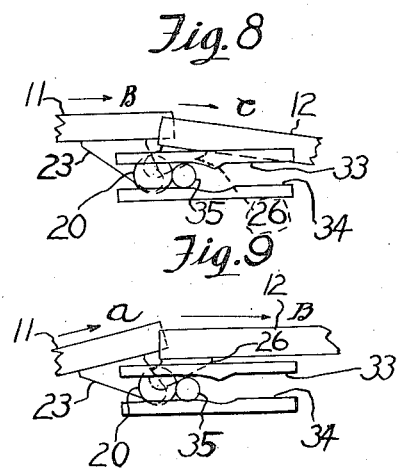
Inventor
William W. Sloane
Clarence F. Poole
Attorney Patented Apr. 14, 1936

2,037,182

UNITED STATES PATENT OFFICE 2,037,182

SHAKER CONVEYER

William W. Sloane, Chicago, Ill., assignor to Goodman Manufacturing Company, Chicago, Ill., a corporation of Illinois Application June 9, 1934, Serial No. 729,783

18 Claims. (Cl. 198—220)

This invention relates to improvements in shaker or jigging conveyers and has as its principal object to provide a power transmitting device of a simplified construction for interchangeably connecting adjacent portions of a conveyer trough or pan line together, so that the violence of the conveying action of the driven section of the pan line may be different than that of the driving section.

My invention may be more clearly understood with reference to the accompanying drawings, wherein:

Figure 1 is a detail plan view of one embodiment of my invention with certain parts broken away and in section;

Figure 2 is a side elevation of the embodiment of my invention illustrated in Figure 1, with the controlling guide means shown in vertical section taken along line 2—2 of Figure 1;

Figure 3 is a view somewhat similar to that shown in Figure 2, but with the conveyer pans shown in section and the controlling guide means arranged in an inverted position from that shown in Figure 2;

Figure 4 is a sectional view taken substantially along line 4—4 of Figure 1;

Figure 5 is a diagrammatical view showing several hypothetical velocity curves of motions imparted by the device of my invention; and Figures 6, 7, 8 and 9 are diagrammatical views illustrating various arrangements of sections of the pan line with respect to each other and the drive connections for moving material therealong in a most efficient manner.

In the drawings, the connecting device embodying my invention is shown as applied to a shaker conveyer trough or pan line generally indicated by reference character 10. Said pan line is adapted to be reciprocably driven by a suitable conveyer drive mechanism (not shown) in the usual manner, and includes a trough section 11 and a trough section 12. Said trough sections may be any adjacent sections of a pan line, which are to be driven at different relative violences with respect to each other, so that material may be conveyed along said sections of said pan line at a substantially uniform rate of speed, even though one section may be horizontal and the other section inclined upwardly or downwardly with respect thereto.

The drive connecting device, as herein shown, is mounted on a suitable stationary base 13 comprising a pair of inwardly facing channel members 14, 14 detachably secured adjacent their opposite ends to the vertical legs of angle supports 15, 15 by means of suitable nuts and bolts, indicated by reference character 16. Said angle supports are secured to suitable cross-members 17, 17 which, in the form shown, are channels having their flanges facing and adapted to engage the ground. Said base is adapted to be held in fixed relationship with respect to the ground by suitable jacks or the like (not shown), which may be interposed between the mine roof and bottom in the usual manner.

The inner sides of the flanges of the channel members 14, 14 are provided with lower guide members 18, 18 and upper guide members 19, 19, the inner portions 18a and 19a of which form horizontal guideways or tracks for anti-friction roller devices 20, 20 mounted on the outer ends of a transverse support member 21. Said transverse support member, together with said roller devices forms a support or carrier unit for the conveyer troughs 11 and 12 in a manner which will now be described.

The trough section 11 is provided with a depending bored connecting member 23 which extends downwardly into a slot 24 in the support member 21 and is pivotally mounted on a horizontal shaft 25 extending transversely of said trough section, and best shown in Figure 4. Said shaft is mounted in the transverse support member 21 in a suitable manner and its longitudinal axis is parallel with but spaced beneath the axis of rotation of the roller devices 20, 20 for supporting an end of the trough section 11 for pivotal movement with respect to said transverse member in a vertical plane.

In a like manner, the trough section 12 is pivotally mounted on the transverse member 21 at its end adjacent the trough section 11. Said trough section is provided with a depending bored connecting member 26 which extends into a slot 27 and is pivotally mounted on a horizontal shaft 28 extending transversely of said trough section. Said shaft, as herein shown, is mounted in the transverse support member 21 in such a manner that its longitudinal axis is parallel with but spaced above the axis of rotation of the roller devices 20, 20, a distance equal to the distance the longitudinal axis of the shaft 25 is spaced below the axis of rotation of said roller devices.

Each pair of upper and lower guide members 18 and 19 is also provided with opposed cam surfaces 33 and 34 formed along the outer sides of their respective horizontal guideways 18a and 19a, as shown in Figures 2 and 3. These cam surfaces form guideways for followers 35, 35 which herein comprise anti-friction rollers carried on the free ends of lever arms 36, 36 extending horizontally from the opposite ends of the supporting member 21.

Each pair of cam surfaces 33 and 34 forms a track or guideway for their respective follower 35 which deviates from parallelism with the adjacent horizontal guideways in which the rollers 20, 20 are mounted. For instance, in Figure 2, said cam surfaces curve upwardly in a relatively gradual incline toward the right end of the device, but return to their initial horizontal plane in a more abrupt angle before the limit of movement of the followers 35 is reached. In Figure 3 said cam surfaces are inverted and curve downwardly in a relatively gradual incline toward the right end of the device, but return to their initial horizontal plane in a more abrupt angle before the limit of movement of the followers 35 is reached.

As herein shown, the extreme peak or depression of said cams is in approximately the first two-thirds of the stroke and said cams are parallel with the horizontal guideways in which the rollers 20, 20 are mounted at the beginning and end of the stroke. It should be understood that the particular arrangement of the cams shown may be varied to vary the motion of the driven trough section and that the length of stroke of the driven trough section may be increased or decreased by inclining said cams in one direction or another at the beginning or end of the stroke.

It will be seen from the foregoing that when the trough section 11 is driven by the conveyer drive mechanism, said trough section will move the transverse support 21 in a horizontal plane along the base 13 on the rollers 20, 20 through the connecting member 23 and shaft 25; and that as the followers 35, 35 engage the guideways formed by the upper and lower cams 33 and 34, the lever arms 36, 36 will be rocked in a vertical plane, which will cause similar movement of said transverse support about the axis of said shaft.

It should be noted that when the rollers 20, 20 and transverse support 21 are in the position shown in Figure 2, the axis of pivotal movement of the connecting member 23 is to one side of the center of the roller devices 20, 20, while the axis of pivotal movement of the connecting member 26 is to the opposite side of the center of said roller devices. As the trough 11 is moved so that the followers 35 approach the peak of their guideways, the transverse support 21 is rocked in a counter-clockwise direction about the axis of the shaft 25 and the pivotal axis of the connecting member 26 is moved at an equal angle to the opposite side of a vertical line intersecting the center of the shaft 25, as is shown in Figure 2. As the follower 35 passes the peak of the cams and rides along the horizontal portions of said cams, the pivotal axis of the connecting member 26 will again be moved to its initial position. The cams are thus formed so that the pivotal axis of the connecting member 26 will rock to equal sides of a perpendicular line intersecting the center of the shaft 25 during each stroke of the pan line 10. Such rocking movement of the support 21, connecting member 26 and trough 12, causes an acceleration and deceleration in movement of the trough 12 during various parts of the stroke caused by the angular displacement of said trough with respect to the trough 11 effected by said cam and lever arm which is such as to change the conveying motion of said trough. When arranged as shown in Figures 2 and 6, the violence of the conveying motion of the trough 12 is increased in such a manner that the conveying effect of said trough may be suitable for moving material up a moderate grade.

In Figure 3, the channel members 14, 14 and cams 33 and 34 have been inverted, so that the guideways are offset toward the lower side of said guide. This is accomplished by disconnecting the nuts and bolts 16 from the angle supports 15, 15, inverting said channel members and reconnecting them in an inverted position. Upon the forward stroke of the trough 11, the follower 35 follows the depression formed by cams 33 and 34. This rocks the pivotal axis of the connecting member 26 in a clockwise direction to one side of a perpendicular line intersecting the center of the shaft 25 during the forward stroke of the conveyer. The arrangement of the cams 33 and 34 is such that the angular displacement of the connecting member 26 is the same as in Figure 2, but said displacement is in an opposite direction than in Figure 2 and to one side of the pivotal axis of the connecting member 23, which decreases the acceleration of the driven trough at different intervals of the stroke. The angular displacement between the two troughs, when rocked in such a manner, is such that the conveying action of the trough 12 is decreased and less violent than the conveying action of the trough 11. Such an arrangement is suitable for conveying material down a moderate incline at a speed of travel similar to its speed of travel along the trough 11, when the trough 11 is driven by drive mechanism suitable for conveying material along the level.

Referring now in particular to Figures 5 to 9, inclusive, diagrammatically illustrating the various connections between the conveyer troughs 11 and 12 and the velocity curves of said troughs when connected in several relationships with respect to each other, the velocity curves indicated by reference characters A, B and C in Figure 5, illustrate effective motions for conveying material, such as coal, along the level or up or down an incline.

When the driving portion of the pan line is horizontally arranged, and the driven portion of the pan line is inclined upwardly with respect thereto, as shown in Figure 6, it is desirable that the conveying effect of the inclined portion of the pan line be more violent than that of the horizontal or level portion of said pan line in order that material may be moved along the entire pan line at a rate which is substantially uniform. Therefore, if it is assumed that the left hand trough section 11, shown in Figure 6, is driven by a motion having characteristics similar to those illustrated by curve B in Figure 5, and the cams 33 and 34 are arranged to cause an upward swing of the follower 35, the transverse member 21 is reciprocated and simultaneously oscillated in a to-and-fro direction about the axis of the shaft 25 for increasing the conveying effect of the trough section 12 in the hereinbefore described manner, so that its conveying motion will be more violent than that of the first trough section and similar to the motion indicated by curve A in Figure 5.

In Figure 7, the left hand portion of the pan line is inclined downwardly so as to discharge material into the right hand portion of the pan line, which is substantially horizontal. When such a condition arises, it is desirable that the conveying effect of the left hand portion of the pan line be less violent than the right hand portion of the pan line. In order to obtain such a conveying effect, the conveyer drive mechanism is operatively connected to the trough 12 for reciprocably driving said trough by a motion whose characteristics are similar to those indicated by curve B in Figure 5, so as to move material in a direction from left to right. When the pan line is so driven, the follower 35 when riding along the cams 33 and 34 will rock the transverse member 21 about the shaft 28. This will cause rocking movement of the connecting member 23 and trough 11 about the axis of said first-mentioned shaft in the hereinbefore described manner, and the angular displacement of said troughs with respect to each other during various parts of the stroke will be such that the conveying effect of the trough 11 will be less violent than that of the trough 12, and similar to that indicated by curve C in Figure 5.

In Figure 8, an arrangement is illustrated in which the trough 11 is substantially horizontal, while the trough 12 is inclined downwardly with respect thereto, so that coal may be discharged from the trough 11 into the trough 12 and moved therealong. The violence of the conveying effect of the trough 12 is decreased by inverting the cams 33 and 34, as previously described, so that the follower 35 rides along the depression formed by cams 33 and 34. Thus, when the trough 11 is driven by a motion similar to that indicated by curve B in Figure 5, and the cams are arranged as illustrated in Figure 8, the trough 12 will be driven by a motion similar to that indicated by curve C in Figure 5, and the speed of movement of material along said troughs will be substantially uniform.

In Figure 9, the trough 12 is driven by a motion which is similar to that indicated by curve B in Figure 5, so as to move material therealong from left to right, and is arranged in a substantially horizontal plane. The trough 11 is inclined upwardly with respect to the ground so as to move material upwardly therealong and discharge it into the trough 12. With such an arrangement, the connecting member 23 of the transverse support 21 is rocked about the axis of the shaft 28, and the conveying effect of the trough 11 is increased so that material may be moved along said trough at substantially the same rate it is moved along the trough 12.

It will be seen from the foregoing, that a number of troughs, or sections of a pan line, may be arranged in several ways with respect to each other to conform to varying grades; that these sections of the pan line may be driven from a single drive mechanism; that the speed of movement of material along said pan line may be substantially uniform regardless of whether it is moving up or down grade, or along the level; and that the initial driving mechanism may be such as to drive the pan line at a motion suitable for conveying material along the level. It should be understood that one or more of such power transmission devices may readily be inserted in the pan line at any points where a change in shaking effort is required. It may further be seen that the change in conveying effort is effected by a simple arrangement of guideways which changes the angular displacement of the troughs with respect to each other during various parts of the stroke, which arrangement may readily be inverted for increasing or decreasing said conveying effort.

While I have herein shown and described one form in which my invention may be embodied, it will be understood that the construction and arrangement of the parts may be altered without departing from the spirit and scope of my invention. I do not, therefore, wish to be understood as limiting myself to the specific construction illustrated herein excepting as specifically limited in the appended claims.

I claim as my invention:

1. In a shaker conveyer, a conveyer pan line including two conveyer troughs, and a connecting device between said troughs for driving one trough from the other with a modified conveying action comprising a base, a member guided for reciprocable movement along said base, means pivotally connecting said troughs to said member on vertically offset transverse axes, and means for rocking said member on a transverse axis during reciprocation thereof.

2. In a shaker conveyer, a conveyer pan line including two conveyer troughs, and a connecting device between said troughs for driving one trough from the other with a different conveying action comprising a base having two non-parallel horizontally extending guideways, a carrier member reciprocably movable along one of said guideways and rockable on a transverse axis, means pivotally connecting said troughs to said member on vertically offset axes, and a follower on said carrier member movable along the second guideway and offset horizontally from the axis of rocking movement of said carrier.

3. In a shaker conveyer, a conveyer pan line including two conveyer troughs, and a connecting device between said troughs for driving one trough from the other with a different conveying action comprising a base having two non-parallel horizontally extending guideways, a carrier member reciprocably movable along one of said guideways and rockable on a transverse axis, means pivotally connecting said troughs to said member on vertically offset axes, a follower on said carrier member movable along the second guideway and offset horizontally from the axis of rocking movement of said carrier, said second guideway being invertible for rocking said carrier in a reverse manner and changing the conveying action of said driven trough.

4. In a power transmitting device for connecting adjacent portions of a shaker conveyer pan line together whereby one portion of the pan line may drive the other at a different violence than that of the driving portion, a driving trough, a carrier support, a transverse pivotal supporting connection between said driving trough and said carrier support, a driven trough, a transverse pivotal supporting connection between said carrier support and driven trough, said last-named connection being parallel to but eccentric of the pivotal connection of said driving trough to said carrier support and being pivotally movable about the axis of pivotal connection of said driving trough thereto during reciprocable movement of said driving trough.

5. In a power transmitting device for connecting adjacent portions of a shaker conveyer pan line together whereby one portion of the pan line may drive the other at a different violence than that of the driving portion, a driving trough, a carrier support, a pivotal connection between said driving trough and said carrier support, a driven trough, a pivotal connection between said carrier support and driven trough, said last-named connection being parallel to but eccentric of the pivotal connection of said driving trough to said carrier support, a cam extending longitudinally of said driving and driven troughs, and an operative connection between said cam and carrier support for pivoting said carrier support about the axis of pivotal connection of said driving trough thereto upon reciprocable movement of said driving trough.

6. In a power transmitting device for connecting adjacent portions of a shaker conveyer pan line together whereby one portion of the pan line may drive the other at a different violence than that of the driving portion, a driving trough, a carrier support, a pivotal connection between said driving trough and said carrier support, a driven trough, a pivotal connection between said carrier support and driven trough, said last-named connection being parallel to but eccentric of the pivotal connection of said driving trough to said carrier support, a stationary guideway extending longitudinally of said driving and driven troughs having a portion deviating from the plane in which said carrier moves, and an operative connection between said guideway and carrier support for rocking said carrier support in reverse directions during each stroke of said driving trough comprising a lever arm extending from said carrier support having engagement with said guideway.

7. In combination with a shaker conveyer, a conveyer trough, a second conveyer trough, and a connection between said troughs whereby the second trough may be driven by the first trough at a different conveying motion than the first trough comprising a carrier support, a horizontal pivotal connection between said carrier support and said first trough, another horizontal pivotal connection between said carrier support and said second trough, said connection being eccentric of the axis of said first connection, and means for rocking said carrier support about the axis of pivotal connection of the driving trough to said carrier support during each stroke of said troughs comprising a stationary guideway extending longitudinally of said troughs, and an operative connection between said carrier support and guideway.

8. In combination with a shaker conveyer, a conveyer trough, a second conveyer trough, and a connection between said troughs whereby the second trough may be driven by the first trough at a different conveying motion than the first trough comprising a carrier support, a horizontal pivotal connection between said carrier support and said first trough, another horizontal pivotal connection between said carrier support and said second trough, said connection being eccentric of the axis of said first connection, and means for rocking said carrier support about the axis of pivotal connection of said driving trough thereto in reverse directions during each stroke of said troughs comprising a stationary guideway deviating from the horizontal and extending longitudinally of said troughs, an arm extending from said carrier support, and an operative connection between the free end of said arm and said cam.

9. In combination with a shaker conveyer, a conveyer trough, a second conveyer trough, and a connection between said troughs whereby the second trough may be driven by the first trough at a different conveying motion than the first trough comprising a carrier support, a horizontal pivotal connection between said carrier support and said first trough, another horizontal pivotal connection between said carrier support and said second trough, said connection being eccentric of the axis of said first connection, and means for rocking said carrier support about the axis of pivotal connection of the driving trough to said carrier support during each stroke of said conveyer comprising a vertically disposed guideway of an irregular formation adapted to be engaged by a rider member for horizontal movement therealong in an irregular path, an operative connection between said guideway and carrier support said guideway being invertible for changing the violence of the conveying motion of the driven trough.

10. In combination with a shaker conveyer, a conveyer trough, a second conveyer trough, and a connection between said troughs whereby the second trough may be driven by the first trough at a different conveying motion than the first trough comprising a carrier support, a horizontal pivotal connection between said carrier support and said first trough, another horizontal pivotal connection between said carrier support and said second trough, said connection being eccentric of the axis of said first connection, means for rocking said carrier support about the axis of pivotal connection of the driving trough to said carrier support during each stroke of said troughs comprising a vertically disposed stationary guideway of an irregular formation including a lower cam having a peak intermediate the ends thereof and an upper cam arranged above said lower cam and having a depression above said peak, an opertive connection between said guideway and carrier support, said guideway being invertible so the lower cam is at the upper side thereof for changing the violence of the conveying motion of the driven trough.

11. In a shaker conveyer, a conveyer pan line including two conveyer troughs adapted to be disposed at different inclinations with respect to each other, and a connection between said troughs whereby one trough may drive the other and the conveying action of the driven trough may be different than that of the driving trough comprising a member forming a pivotal support for an end of one of said troughs and a pivotal support for an adjacent end of the other trough disposed eccentric of the axis of pivotal connection of the first trough to said member, and means for rocking said member about the axis of pivotal connection of one of said troughs thereto upon reciprocable movement of said troughs.

12. In a shaker conveyer, a conveyer pan line including two conveyer troughs adapted to be disposed at different inclinations with respect to each other, and a connection between said troughs whereby one trough may drive the other and the conveying action of the driven trough may be different than that of the driving trough comprising a member forming a pivotal support for an end of one of said troughs and a pivotal support for an adjacent end of the other trough disposed eccentric of the axis of pivotal connection of the first trough to said member, and means for rocking said member about the axis of pivotal connection of one of said troughs thereto upon reciprocable movement of said troughs comprising an oscillatably movable arm extending from said member.

13. In a shaker conveyer, a conveyer pan line including two conveyer troughs adapted to be disposed at different inclinations with respect to each other, and a connection between said troughs whereby one trough may drive the other and the conveying action of the driven trough may be different than that of the driving trough comprising a member forming a pivotal support for an end of one of said troughs and a pivotal support for an adjacent end of the other trough disposed eccentric of the axis of pivotal connection of the first trough to said member, and means for rocking said member about the axis of pivotal connection of one of said troughs thereto upon reciprocable movement of said troughs comprising a cam, and an arm extending from said member having its free end guided by said cam.

14. In a shaker conveyer, a conveyer pan line including two conveyer troughs, and a connection between said troughs for driving one trough from the other at a conveying action having a different violence than that of the driving trough comprising a reciprocably movable support for adjacent ends of each of said troughs, said troughs being pivotally mounted on said support about parallel eccentric axes, and means for rocking said support about the axis of pivotal connection of one of said troughs thereto during each stroke of said conveyer.

15. In a shaker conveyer, a conveyer pan line including two conveyer troughs, and a connection between said troughs for driving one trough from the other at a conveying action having a different violence than that of the driving trough comprising a reciprocably movable support for adjacent ends of each of said troughs, said troughs being pivotally mounted on said support about parallel eccentric axes, and means for rocking said support about the axis of pivotal connection of one of said troughs thereto during each stroke of said conveyer comprising an arm extending from said support and having its free end guided for oscillatable movement in a vertical plane.

16. In a shaker conveyer, a conveyer pan line including two conveyer troughs, and a connection between said troughs for driving one trough from the other at a conveying action having a different violence than that of the driving trough comprising a reciprocably movable support for adjacent ends of each of said troughs, said troughs being pivotally mounted on said support about parallel eccentric axes, and means for rocking said support about the axis of pivotal connection of one of said troughs thereto during each stroke of said conveyer comprising an arm extending from said support and an irregular guideway operatively connected with the free end of said arm.

17. In a shaker conveyer, a conveyer pan line including two conveyer troughs, and a connection between said troughs for driving one trough from the other at a conveying action having a different violence than that of the driving trough comprising a reciprocably movable support for adjacent ends of each of said troughs, said troughs being pivotally mounted on said support about parallel eccentric axes, and means for rocking said support about the axis of pivotal connection of one of said troughs thereto during each stroke of said conveyer comprising an arm extending from said support, an irregular guideway, and a follower on the free end of said arm engaging said guideway.

18. In a shaker conveyer, a conveyer pan line including two conveyer troughs, and a connection between said troughs for driving one trough from the other at a conveying action having a different violence than that of the driving trough comprising a reciprocably movable support for adjacent ends of each of said troughs, said troughs being pivotally mounted on said support about parallel eccentric axes, and means for rocking said support about the axis of pivotal connection of one of said troughs thereto during each stroke of said conveyer comprising an arm extending from said support and an irregular guideway adapted to guide said arm for oscillatable movement about the axis of pivotal connection of one of said troughs to said support.

WILLIAM W. SLOANE.